United States Patent [19]

Barra et al.

[11] 4,179,328

[45] Dec. 18, 1979

[54] METHOD AND APPARATUS FOR INJECTING STRIPPING GAS INTO THE REBOILER SECTION OF A GLYCOL REBOILER

[75] Inventors: Frank J. Barra; Richard L. Schleier, both of Houston, Tex.

[73] Assignee: Smith Industries, Inc., Houston, Tex.

[21] Appl. No.: 869,300

[22] Filed: Jan. 13, 1978

[51] Int. Cl.² ............................................. B01D 1/14
[52] U.S. Cl. .................................. 159/16 R; 159/23; 203/18; 203/49
[58] Field of Search .................. 159/16 R, 16 A, 3; 203/49, 18; 62/20, 17; 159/22, 23, 29

[56] References Cited

U.S. PATENT DOCUMENTS

| | | | |
|---|---|---|---|
| 3,105,748 | 10/1963 | Stahl | 203/18 |
| 3,233,390 | 2/1966 | Meyers | 159/16 R |
| 3,397,731 | 8/1968 | Gravis et al. | 159/16 R |
| 3,727,382 | 4/1973 | Jackson | 55/160 |
| 3,841,382 | 10/1974 | Gravis et al. | 159/16 R |

*Primary Examiner*—Norman Yudkoff
*Attorney, Agent, or Firm*—David M. Ostfeld; Ned L. Conley; Murray Robinson

[57] ABSTRACT

A reboiler for dehydrating di- or tri- ethylene glycol comprises a cylindrical, horizontal axis tank having a ceramic packed still column rising from its top near one end and a single U shaped fire tube extending longitudinally from the front end of the tank interiorly thereof toward its back end. Wet glycol is admitted to the base of the still column above a half tray and overflows into a catch pipe which drains into the front end of the tank. Dry glycol is taken off through an outlet at the bottom rear of the tank. Dry gas is admitted to the reboiler through a sparging pipe extending longitudinally of the tank from near the back end of the fire tube and then over the outlet to near the back end of the tank. A box shaped trough extending under and about the pipe separates the glycol adjacent the sparging pipe from an in-tank reservoir located below the pipe formed by a divider plate located near the front end of the pipe. A sawtooth weir at the back end of the trough allows the glycol to overflow into the reservoir. The efficiency of the sparging gas is enhanced by a layer of packing sandwiched between upper and lower sheets of expanded metal extending horizontally in the trough. The sandwich is spaced above the sparger pipe and spaced below the level of the weir.

9 Claims, 14 Drawing Figures

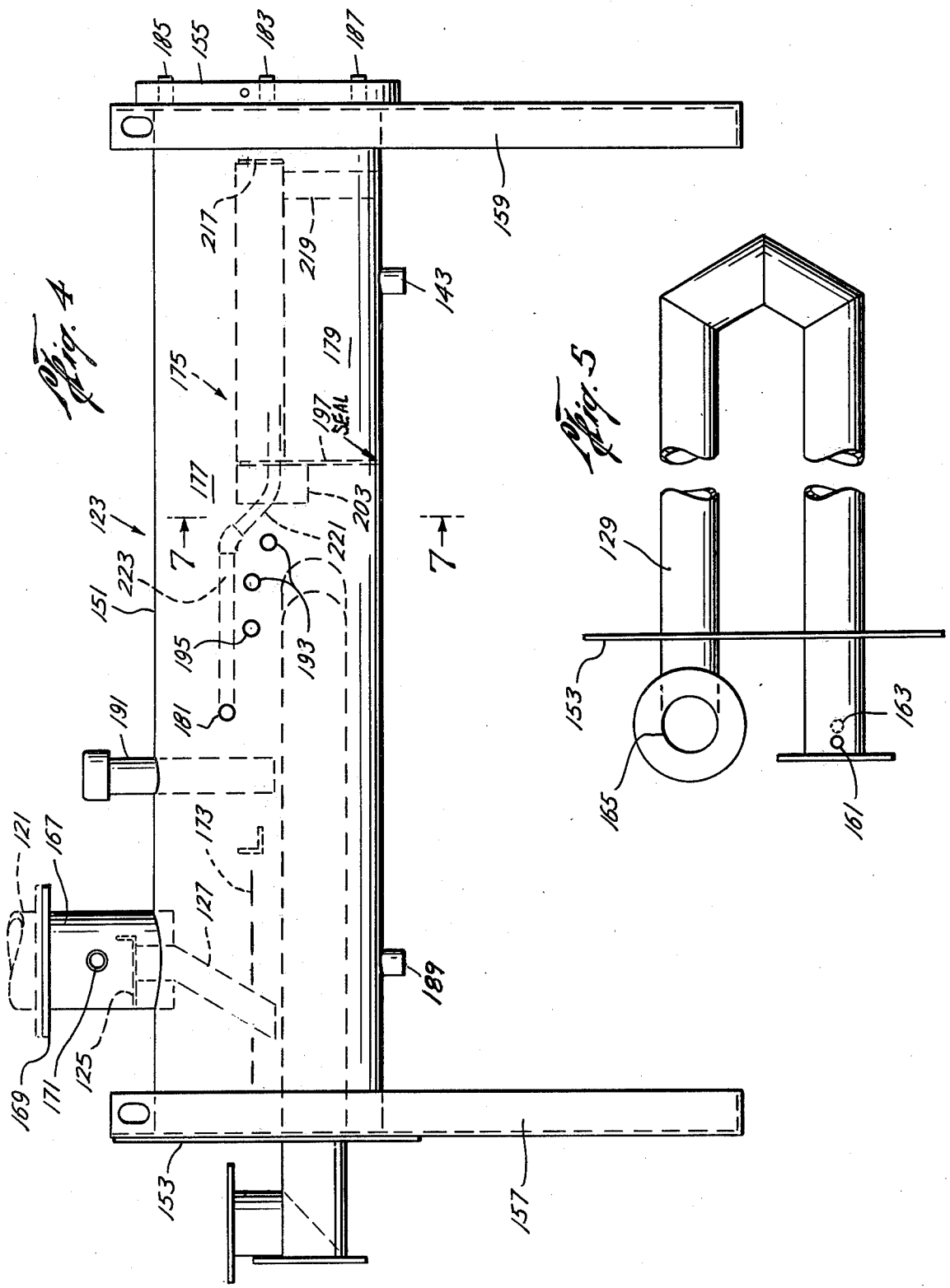

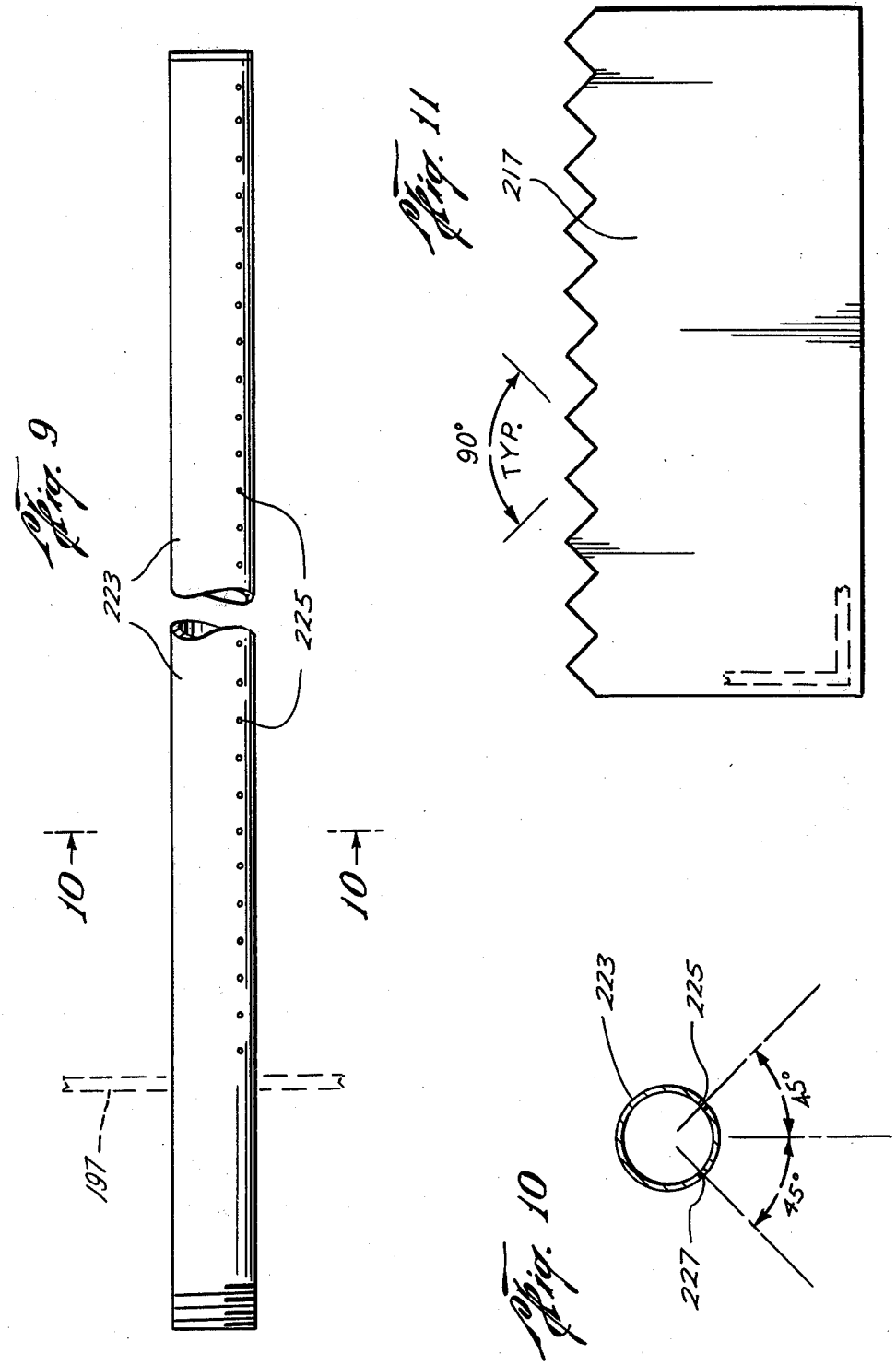

METHOD AND APPARATUS FOR INJECTING STRIPPING GAS INTO THE REBOILER SECTION OF A GLYCOL REBOILER

BACKGROUND OF THE INVENTION (1) Field of the Invention

This invention relates to dehydration of ethylene glycol in a reboiler and more particularly to enhanced dehydration by sparging the reboiled liquid while still in the reboiler, using dry gas as the sparging medium.

(2) Description of the Prior Art

Heretofore it has been known to introduce dry gas into a stream of partially dried glycol before heating it in the coil of a liquid tube reboiler, as disclosed in U.S. Pat. No. 2,428,643—Young (filed 1944).

In a preprint of a paper to be delivered by Steve Worley to a Gas Conditioning Conference sponsored by the Oklahoma Continuing Education Center at the University of Oklahoma it is stated that in the years 1950–51 B. S. and B. sold glycol reboilers with provision for introduction of natural gas into the reboiler. (Paper to be delivered April 1967).

In U.S. Pat. No. 3,105,748—Stahl (filed 1957), it is disclosed that dry gas can be introduced into a saddle packed superdrier to contact partially dried glycol from a reboiler.

In U.S. Pat. No. 3,233,390—Meyers (filed 1963), it is disclosed that dry gas can be introduced into a rear compartment of a glycol reboiler tank, the compartment being separated from the front or fire tube compartment by a weir. The gas is introduced into the bottom of the rear compartment by a spreader. Somewhat similarly, it is shown in U.S. Pat. No. 3,397,731—Gravis III et al. (filed 1966) that dry gas may be admitted to the bottom rear portion of a fire tube reboiler tank. The rear portion of the tank is separated from the front portion by a weir. The gas is admitted via sparger pipes extending beneath a plurality of baffles in the rear portion of the tank. The pipes run parallel to the pipe axis and fire tubes.

It is also known to introduce dry gas into the front section of a two section reboiler tank via a sparging pipe extending transversely of the tank just ahead of the weir that divides the front or fire tube section of the tank from the rear or storage section, and as will be described in more detail hereinafter, it is known to introduce dry gas into a section of a fire tube reboiler tank downstream from a weir separating the front or fire tube section from the remainder of the tank.

SUMMARY OF THE INVENTION

According to the invention, there is provided a glycol dehydrating unit of the two section fire tube reboiler type. Dry gas is introduced into the tank in the section thereof upstream from the weir that separates the storage section from the remainder or upstream section of the tank. There is a plate dividing the lower part of the tank between the upstream and downstream sections. There is a slot in the upper part of the plate which connects to a trough that continues the upstream section of the tank over the top of the downstream section, the weir being at the end of the trough nearest the downstream end of the trough. A sparging pipe extends the length of the trough and admits dry gas thereto below the level of the weir. Saddle packing material sandwiched between two layers of expanded metal extends horizontally in the trough below the level of the weir and somewhat above the level of the sparging pipe, thereby to cause increased contact between the gas and the glycol.

BRIEF DESCRIPTION OF THE DRAWINGS

For a detailed description of a preferred embodiment of the invention, reference will now be made to the accompanying drawings, which except for the schematics, are to scale. The drawings employ the usual conventions to indicate materials, from which it will be seen that except for the packing materials, which typically are ceramic, all parts are made of metal, e.g. steel.

In the accompanying drawings,

FIG. 4 is a side elevation of a reboiler embodying the invention;

FIG. 5 is a plan view of the fire tube of the reboiler of FIG. 4;

FIG. 9 is an elevation of the sparging pipe employed in the reboiler;

FIG. 10 is a section taken at plane 10—10 of FIG. 9;

FIG. 11 is a front view of the weir at the end of the unit shown in FIG. 6;

DETAILED DESCRIPTION

Figure 1:
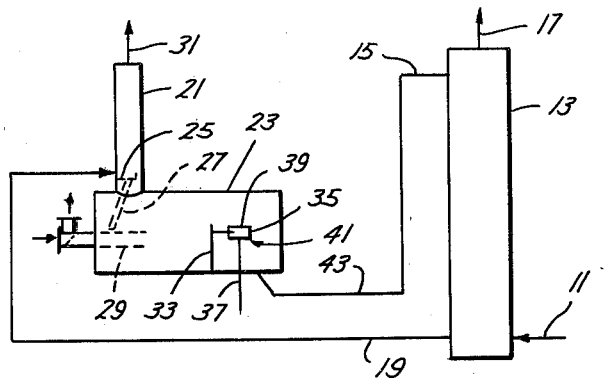
FIG. 1 is a schematic view of prior art apparatus for dehydrating natural gas with ethylene glycol and drying the glycol for reuse.
Figure 2:
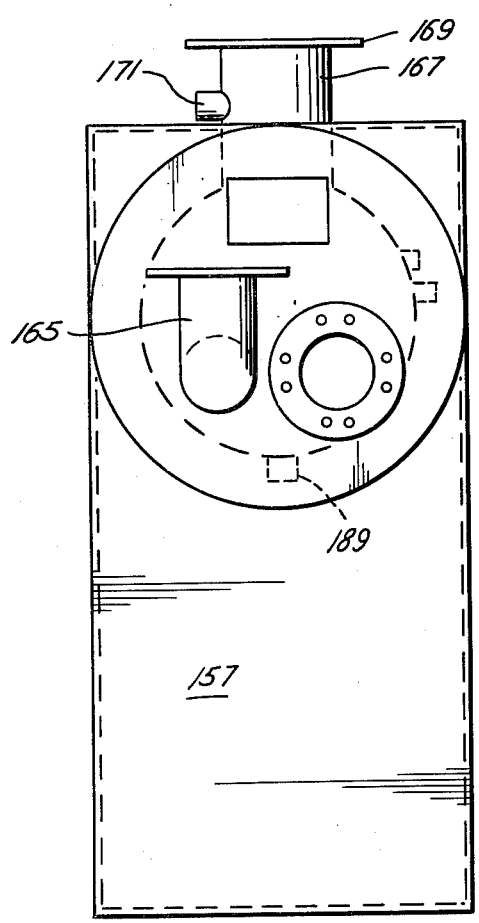
FIGS. 2 and 3 are front and rear end views of the reboiler shown in FIG. 4.
Figure 3:
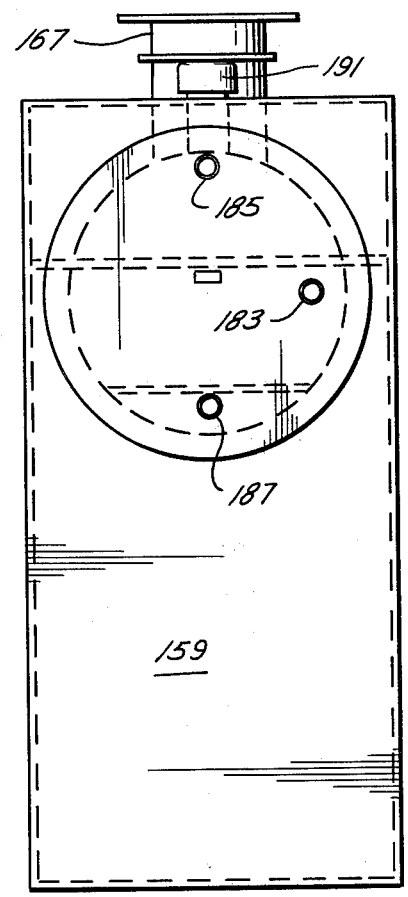
Figure 6:
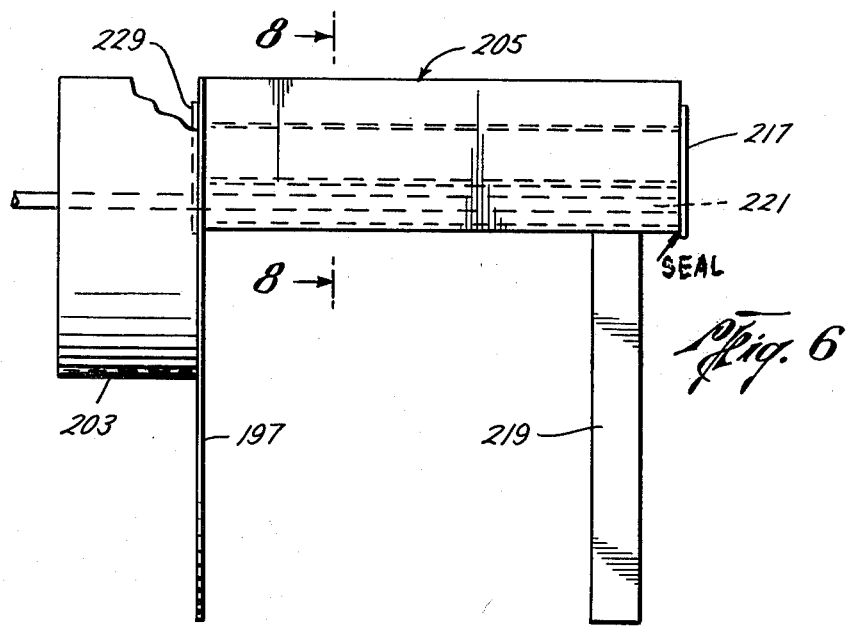
FIG. 6 is an elevation of a unit employed in the reboiler.
Figure 7:
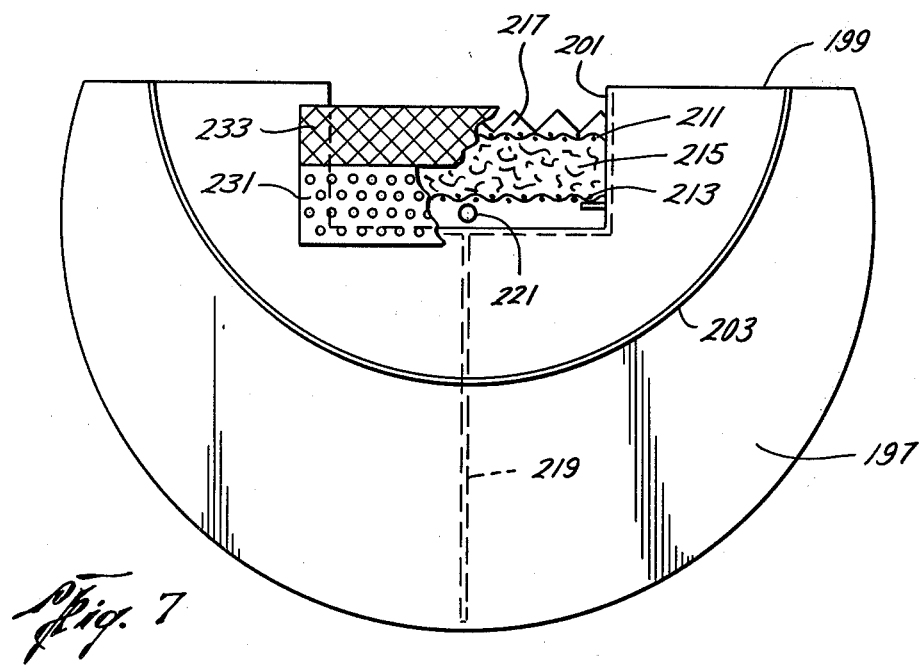
FIG. 7 is a section taken at plane 7—7 of FIG. 4, showing the front end of the unit of FIG. 6.

Referring now to FIG. 1 there is shown previously known apparatus for dehydration of natural gas. Gas to be dried comes in via pipe 11 and enters a lower part of absorption unit 13 where it contacts downwardly flowing glycol which enters an upper part of the absorption unit via pipe 15. Absorption unit 13 may be any conventional type of apparatus for contacting gas and liquid, e.g. a bubble tray tower. After contacting the glycol, the dried gas leaves the top of the absorption unit via pipe 17. The wet glycol leaves near the bottom of unit 13 via pipe 19 and enters the bottom of still column 21 which is attached to the top of reboiler 23.

The wet glycol is injected onto a half tray 25 in the bottom of still column 21 where it contacts rich steam rising from the reboiler. The wet glycol then pours down through a pipe 27 to one end of the reboiler. The glycol is heated by fire tube 29. The resultant steam which passes up through still column 21 carries some glycol. In the still column, the vapors are cooled, but not below the boiling point of water. The steam passes out the top of the still column as indicated at 31, while the glycol is condensed and falls back through the still column, absorbing glycol from the rising vapors.

The glycol entering the reboiler from the still column via pipe 27 travels longitudinally of the reboiler, being heated by the tube. At the other end of the reboiler, the partially dried glycol passes over saw tooth weir 33 and into sparging box 35.

Dry gas enters the sparging box through pipe 37, bubbles up through the permeable bottom of the box and the glycol layer (for example, ¾ to one inch thick) therein. The outlet from the sparging box is over a lower saw tooth weir 39 and into reservoir 41.

The dry glycol stored in the reservoir is kept warm since the reservoir is located inside the reboiler. The dry glycol leaves the reservoir via pipe 43 and enters the top of absorption unit 13.

Referring now to FIGS. 2-5, there is shown a reboiler embodying the invention which may be used in place of the reboiler 23 in the apparatus shown in FIG. 1. Except for the means for introducing dry gas into the reboiler, the reboiler of FIGS. 2-5 is the same as reboiler 23 and like parts will be given like reference numbers except increased by 100, thereby avoiding repetition of the previous description.

Figure 13:
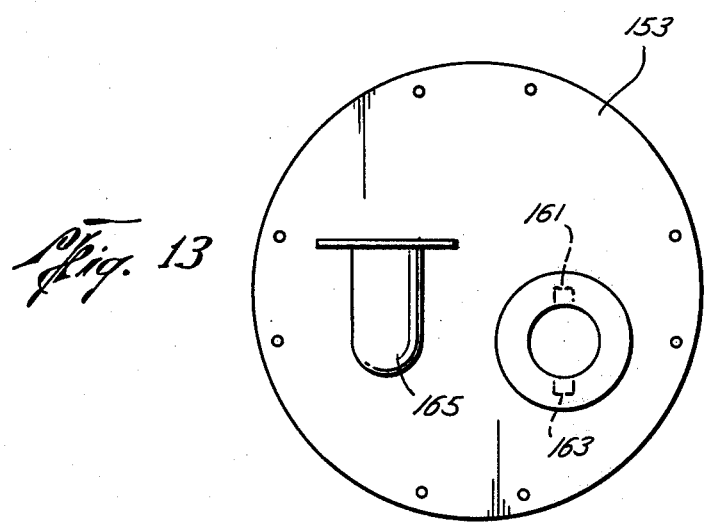
FIG. 13 is an end view of the fire tube.
Figure 14:
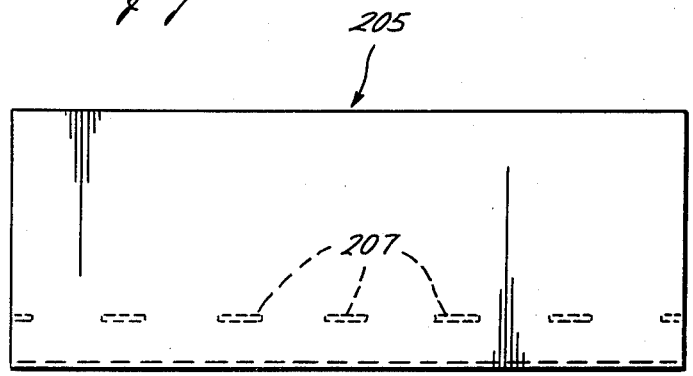
FIG. 14 is a side elevation of the trough forming part of the unit shown in FIG. 6.

Reboiler 123 includes a generally cylindrical tank 151 having a front end 153 and a back end 155. The tank is supported in an elevated position by legs 157, 159. Extending longitudinally of the tank from the front end thereof toward the back end is fire tube bight 129. Fuel is admitted to the fire tube via burner connection 161 (see also FIG. 13) and pilot connection 163. Products of combustion exit through elbow 165.

At the top of the tank near the front end is a short tube 167 having a flange 169 providing means for making connection to packed still column 121. In the side of tube 167 there is an inlet pipe 171 for making connection with a wet glycol pipe. Below inlet pipe 171 the tube is provided with half tray 125 for catching the glycol. Overflow from tray 125 is caught in pipe 127 which leads down to the front end of the tank to below the normal liquid level therein indicated at 173. At the bottom of the tank near the back wall there is a dry glycol outlet 143.

Between glycol inlet 171 and outlet 143, there is provided a unit 175 dividing the tank into an upstream section 177 and a downstream section 179. Downstream 179 encompasses glycol outlet 143 and constitutes a reservoir for storage of dry glycol, whereas in section 177 the wet glycol is being dried, partly by virtue of the heat from fire tube 129 which drives off water as steam and partly by virtue of dry gas contacted with the glycol, such gas coming in via inlet 181.

The back end of the tank is provided with a skimmer connection 183 and gage glass connections 185, 187. The tank is further provided in its upstream section with a drain 189 and a fill connection 191, both closed normally by caps, plugs, or valves. Thermostat and thermometer wells are provided in the side of the tank at 193, 195.

Referring now to FIGS. 6-12 and 14, as well as FIG. 4, unit 175 includes a vertical plate or partition 197 of generally semi-circular or segment shape sealed to the bottom of the tank and extending upwardly towards but not reaching the top of the tank. The partition's upper edge 199 is horizontal and is interrupted by a rectangular U shape slot 201. On the front side of the partition is secured a semi-circular plate 203 of smaller radius than the tank. Plate 203 has its axis parallel to the tank axis and commencing at top edge 199 extends down past one side of slot 201 and under the slot and back up past the other side of the slot to edge 199. The axis of plate 203 is perpendicular to partition 197.

Figure 8:
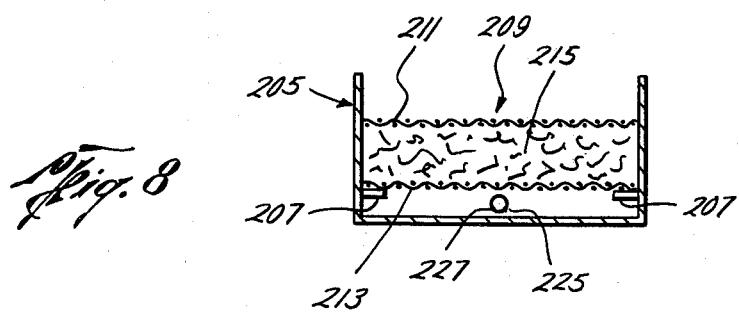
FIG. 8 is a section taken at plane 8—8 of FIG. 6.
Figure 12:
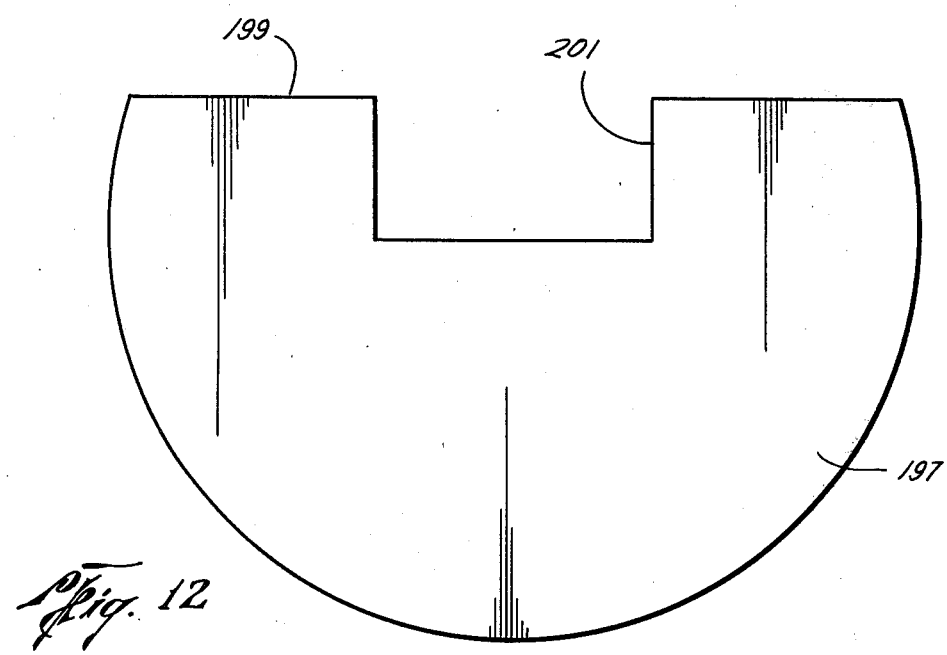
FIG. 12 is a front view of the divider plate of the unit shown in FIG. 6.

On the back side of partition 197 is secured a trough 205. As best shown in FIG. 8 the trough is of rectangular U shape cross section, the same shape and size as slot 201, and is in register therewith. On the interior of the side walls of the trough located at a distance above the bottom of the trough are shelves 207. Resting on the shelves is a sandwich 209 comprising upper and lower expanded metal sheets 211, 213 with a mass 215 of packing material, e.g. ceramic saddles, therebetween. The upper sheet 211 is tack welded to the sides of the trough to keep it in place, especially with respect to movement as might otherwise occur during transportation.

The back end of the trough is closed by a weir 217 sealed thereto. The upper edge of the weir is saw toothed to insure that overflow will be distributed along the full length of the upper edge of the weir. The upper edge of weir 217 is at a higher level than the upper sheet of expanded metal 211 of packing sandwich 209.

It will be apparent that the front end of unit 175 is supported in the tank by partition 197. The back end of the unit is supported by leg 219.

Extending the length of trough 205 is sparging pipe 221. The pipe lies in the space in the trough under the packing material sandwich, being located a distance above the bottom of the trough and a distance below the bottom of the sandwich. The pipe is closed off at its back end and supported by weir 217. The front end of the pipe extends through slot 201 and over plate 203 where it joins connecting line 223 which connect to gas inlet 181, thereby supporting the front end of the sparging pipe. As best seen in FIGS. 8, 9 and 10 the lower end of the sparging pipe 221 is apertured, that is, it is provided with a plurality of small holes. The holes are arranged in two lines, one line of holes 225 extending downwardly at, for example, a 45 degree angle to the vertical toward one side the trough and the other line of holes 227 extending downwardly at, for example, a 45 degree angle to the vertical toward the other side of the trough. There may, for example, be 22 holes in each row, spaced one inch apart in the row, the holes being interlaced so that each hole in one row is one-half inch from the adjacent holes in the other row. The holes may be 1/16 inch in diameter. The sparger pipe may have an outer diameter of one and one-quarter inches and a wall thickness of about one-sixteenths to one-eighth inch for example. The axis of the pipe may be one and one-half inches off the bottom of the trough and three quarters of an inch below the packing material sandwich.

The packing material sandwich may have a depth of, for example, 3¼ inches, and the trough may have a depth of, for example, 7½ inches and width of ten inches. These and the other dimensions given are suitable, for example, for a 750 M. BTU/HR reboiler.

To retain the packing material in sandwich 205 at the front end thereof, a foraminous member 229 is placed over the front of slot 201. Member 229 may include an apertured plate portion 231 and/or a wire screen portion 233.

In operation, wet glycol entering via pipe 127 is heated by submerged fire tube 129. Steam and glycol vapor separates from the liquid glycol and water solution at interface 173, whose level is determined by weir 217. Dry gas entering the upstream section of the reboiler just in advance of weir 217 takes further water out of the glycol before the dry glycol falls over weir 217 into the downstream section or reservoir 179.

In operation, the packing 215 are ceramic saddles made, for example, by U.S. Stoneware, a subsidiary of Norton Company under the brank name "Interlock". Reboiler 123 operates at atmospheric pressures and at temperatures, for example, between 370° Fahrenheit to 390° Fahrenheit when stripping gas is used at inlet 181 and as low as, for example, 350° Fahrenheit when stripping gas is not used. When stripping gas is used at inlet 181, quantities of such gas in the range, for example, of one to three cubic feet per gallon of glycol circulated, and preferably one to two cubic feet per gallon of glycol circulated, are used. The rate of glycol circulation is based on the amount of water removed from the gas stream, such as, for example, one and one-half to four gallons per pound of water removed from the gas stream, typically ten to two thousand gallons per hour of circulation. Further details of glycol and gas dehydration are contained in the "Installation & Operation Manual Glycol Dehydration of Smith Industries, Inc.", a copy of which is attached to this Specification and hereby made a part of this application.

While a preferred embodiment of the invention has been shown and described, modifications thereof can be made by one skilled in the art without departing from the spirit of the invention.

We claim:

1. A glycol dehydration reboiler comprising:
   a generally cylindrical tank having a front end and a back end with heating means extending longitudinally in the tank from the front end thereof part way toward the back end of the tank and means at the upper part of the tank near the front end thereof for connection to a still column and to glycol inlet means, and outlet means at the lower part of the tank near the back end thereof for removal of glycol from the tank;
   divider means located in the tank between the heating means and the back end of the tank and dividing the tank between upstream and downstream sections, said divider means including a partition extending upwardly from the bottom of the tank near the heating means and terminating at a level a distance below the top of the tank, said partition having a slot in its upper edge, a trough extending from the slot longitudinally of the tank at a distance above the bottom of the tank toward the back end of the tank, and a weir across the back end of the trough; and
   sparging means for introducing dry gas into the upstream section of the tank comprising an apertured pipe extending along the length of the trough below the level of the weir, said sparging means further including a layer of packing means in the trough above the pipe.

2. Reboiler according to claim 1, said packing means comprising a mass of ceramic packing saddles sandwiched between two sheets of expanded metal.

3. Reboiler according to claim 2, said trough being of rectangular U shape cross section with means on the insides of its side walls for supporting the sandwich a distance above the pipe but below the upper edge of the weir.

4. Reboiler according to claim 3 including means for supporting the pipe at a distance above the bottom of the trough, the apertures in the pipe being on the lower side thereof.

5. Reboiler according to claim 4, the apertures in the bottom of the pipe being disposed in two rows, the apertures in one row directing the gas flow downwardly but angularly toward one side of the trough and those in the other row directing gas flow downwardly but angularly toward the other side of the trough.

6. Reboiler according to claim 5, the end of the trough adjacent the slot in the partition being covered by foraminous means to retain the packing saddles in the packing means.

7. Reboiler according to claim 6, including a semicylindrical plate attached to the partition on the side opposite from the trough with the axis of the plate extending longitudinally of the tank, the plate extending from one side of the slot down below the slot and back up to the other side of the slot.

8. A glycol dehydration reboiler for use with a still column and a glycol inlet, comprising:
   a container having a front end and a back end;
   heating means extending longitudinally in the container from the front end of the container part way toward the back end of the container for heating the contents of the container;
   means in the front end of the container for connection to the still column and to the glycol inlet;
   outlet means in the back end of the container for removal of glycol from the container;
   divider means located in the container between the heating means and the back end of the container for dividing the container between upstream and downstream sections, said divider means including
      a partition extending upwardly from the bottom of the container near the heating means and terminating at a level below the top of the container, said partition having a slot in its upper edge,
      a trough extending from the slot longitudinally of the container above the bottom of the container toward the back end of the container, and
      a weir across the back end of the trough;
   sparging means for introducing dry gas into the glycol in the trough; and
   a layer of packing in the trough above the sparging means and below the level of the weir.

9. Method of dehydrating wet ethylene glycol comprising the steps of introducing the wet glycol into the upstream section of a reboiler, heating the glycol to drive off the water as steam at the liquid-vapor interface in the reboiler, drawing off the glycol over a weir into the downstream section of the reboiler, and sparging the glycol upstream of the weir by introducing dry gas into the glycol below said interface in a plurality of finely divided streams, and causing said streams to flow in a turbulent manner through said glycol between solid, irregularly shaped and tightly packed contact enhancing media within said downstream section before rising to said interface.

* * * * *